US005303885A

United States Patent [19]

Wade

[11] Patent Number: 5,303,885
[45] Date of Patent: Apr. 19, 1994

[54] ADJUSTABLE PIPE HANGER

[76] Inventor: Lionel T. Wade, 141 Meadow View Rd., Orinda, Calif. 94563

[21] Appl. No.: 990,653

[22] Filed: Dec. 14, 1992

[51] Int. Cl.$^5$ ............................................. F16L 3/00
[52] U.S. Cl. ..................................... 248/59; 248/62; 24/543
[58] Field of Search ...................... 248/59, 58, 62, 61, 248/63, 64, 317, 320, 327; 24/115 H, 112, 543

[56] References Cited

U.S. PATENT DOCUMENTS

| | | | |
|---|---|---|---|
| 476,815 | 6/1892 | Petterson | 248/59 |
| 3,049,326 | 8/1962 | Otterson | 248/59 |
| 3,066,181 | 11/1962 | Flower | 248/61 X |
| 3,377,038 | 4/1968 | Loundon | 248/59 |
| 3,415,473 | 12/1968 | Ollen | 248/59 |
| 3,667,709 | 6/1972 | Linser | 248/59 |
| 4,036,460 | 7/1977 | Storck et al. | 248/59 |

FOREIGN PATENT DOCUMENTS 0434681 9/1926 Fed. Rep. of Germany ........ 248/59

OTHER PUBLICATIONS

Erico Products Catalog—1973.

Primary Examiner—Ramon O. Ramirez
Attorney, Agent, or Firm—Harris Zimmerman

[57] ABSTRACT

A pipe hanger assembly that provides infinite adjustment of vertical spacing throughout a wide range of adjustability includes a pipe clamp member comprising a first wire or rod having a linear segment extending upwardly from a distal open circular loop. The end of the circular portion include an integrally formed hook portion adapted to engage a distal portion of the linear segment. The wire or rod is preferably formed of resilient material, such as steel wire, so that the circular loop may be deformed to open and engage the circumferential surface of a pipe, and then closed about the pipe by engaging the hook about the linear segment. The assembly also includes a second wire or rod having a linear segment and an integral upper eye formed thereby. The eye is secured to a structural member by a screw or nail. The spring clip of the pipe hanger assembly includes a central web, and two pair of arms extending integrally from the web. Each pair of arms is disposed in a V-configuration, and includes aligned hole in each arm, so that a wire or rod may be extended through the aligned holes. The holes are dimensioned so that the wire is slidably translated therethrough when the pair of arms are resiliently deformed by manually squeezing together. Releasing the arms permits the arms to flex outwardly by intrinsic resilient force, the edges of the aligned holes engaging the wire in a frictional lock. Each pair of arms of the spring clip may be actuated independently to permit the longitudinal adjustment of the spacing of the first and second wires or rods, whereby the spacing of the circular loop from the existing structural member may be selectively varied in an infinitely adjustable manner throughout the entire range of adjustment of the assembly.

19 Claims, 3 Drawing Sheets

U.S. Patent     Apr. 19, 1994     Sheet 1 of 3     5,303,885
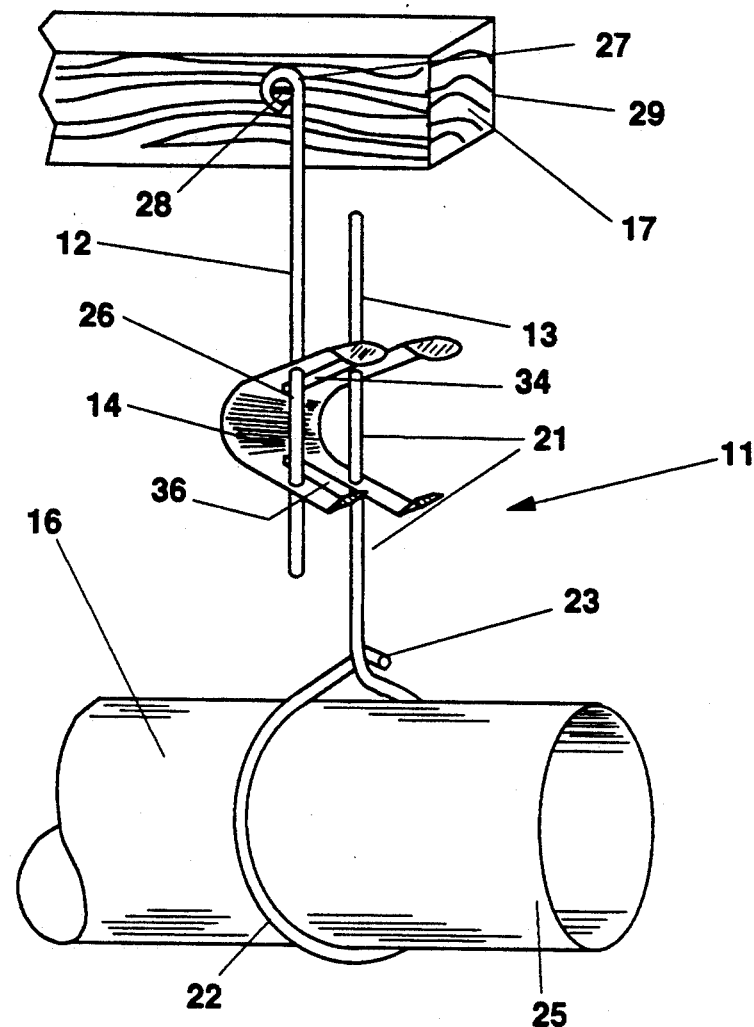
Figure_1
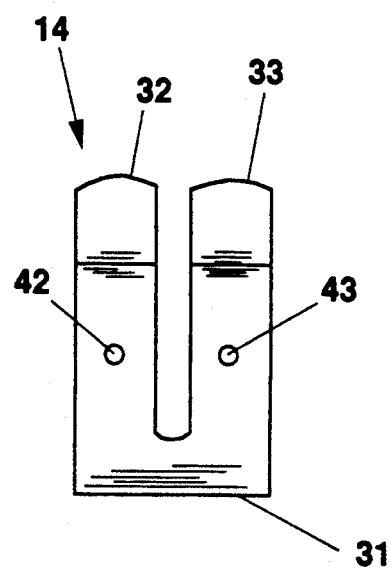
Figure_2

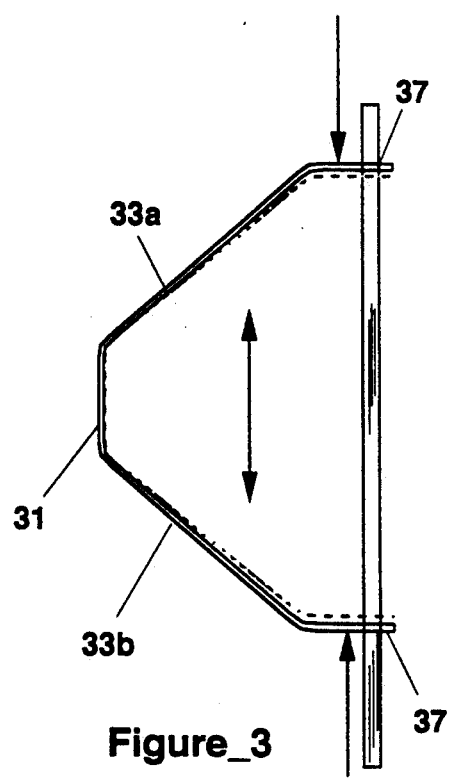
Figure_3
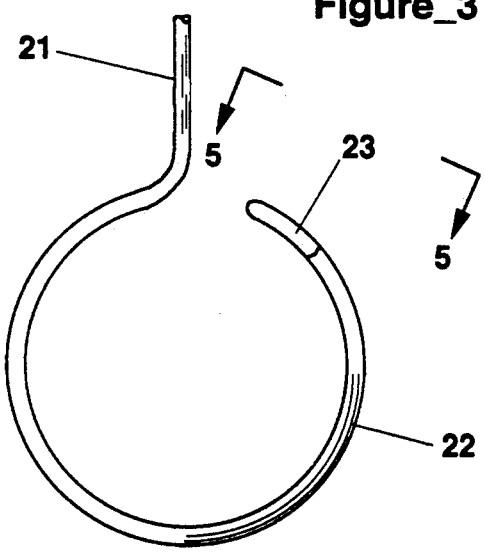
Figure_4
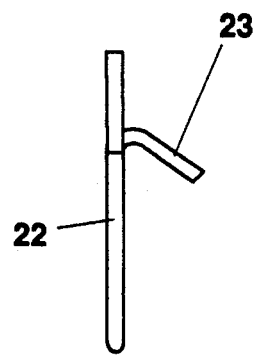
Figure_5
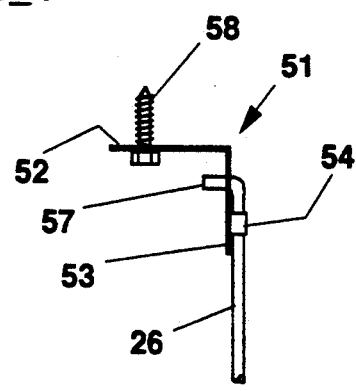
Figure_6
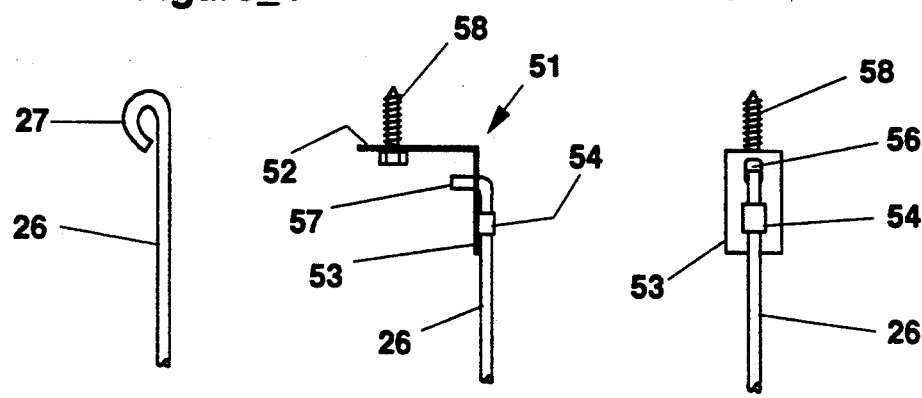
Figure_7
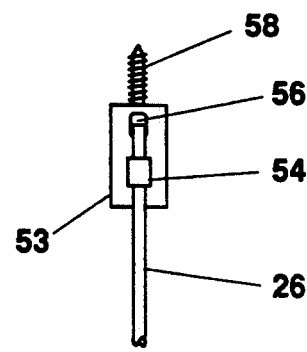
Figure_8

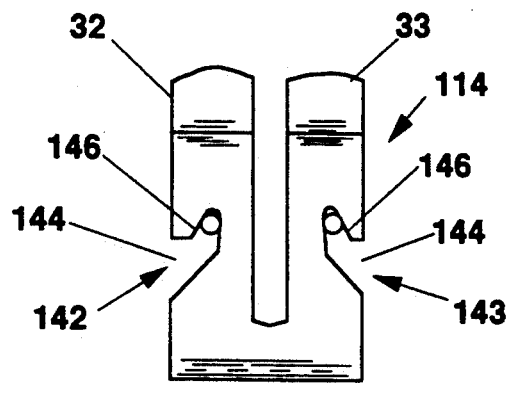
Figure_9
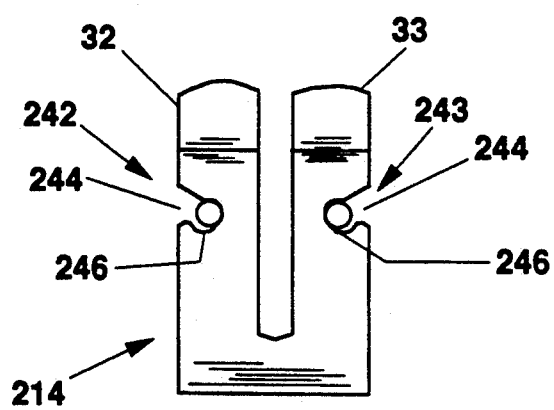
Figure_10
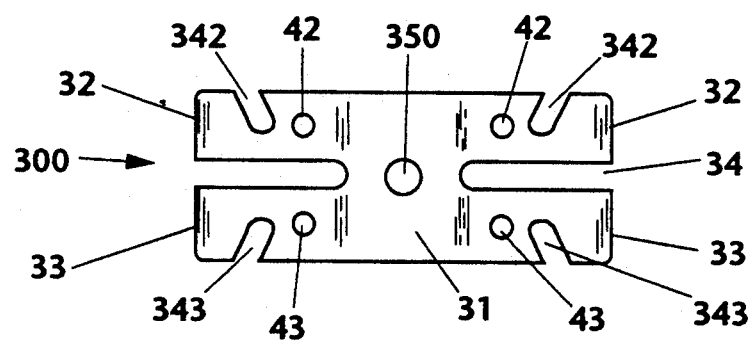
Figure_11
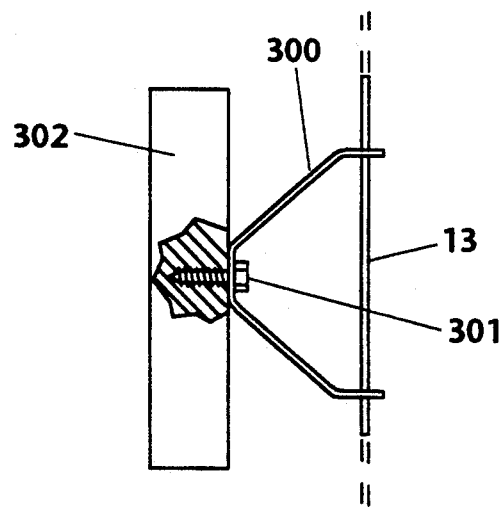
Figure_12

ADJUSTABLE PIPE HANGER

BACKGROUND OF THE INVENTION

The field of the invention comprises support assemblies for suspending pipes and conduit from structural members, ceilings, and walls.

There are known in the prior art various forms of pipe hangers for supporting pipes, conduit, ventilation ducts, and the like within structures. Virtually all habitable structures require various combinations of plumbing pipes, ventilation ducts, electrical conduit, gas pipes, and the like to provide the necessary utility services. These pipes, conduit, and ducts, hereinafter termed pipes, are generally supported by pipe hangers that suspend the pipes from structural members within the building.

Pipe hangers generally comprise a plurality of suspension units that are spaced longitudinally along the pipe run, so that each suspension unit supports a small portion of the pipe and its contents. Prior art pipe hangers usually include a bracket to secure the hanger to a structural member, a strap, rod, bar, or the like extending downwardly from the bracket, and a pipe engaging clamp or strap secured to the depending member. Many combinations of these components are known in the prior art.

It may be appreciated that some pipe runs, such as waste pipes, are intentionally inclined, and the pipe hangers must be adjustable so that the spacing of the pipe from a supporting structural member differs smoothly and uniformly. Likewise, the structural members may be inclined while the pipe run is preferably horizontal. Thus, an important characteristic of pipe hangers is that they be adjustable in length to suit the situation in which the pipe is placed. In the prior art, there are known many arrangements for achieving adjustable spacing from the supporting structural member. For example, the bracket and/or strap and/or pipe clamp may be joined by threaded means, thereby providing infinite adjustment capability through a small range of vertical adjustability. Likewise, the depending strap may be provided with vertically spaced holes having a fixed spacing, and the pipe clamp may be secured by bolts or other fasteners in one of the preformed holes to approximate the desired vertical spacing. These devices are not infinitely adjustable, but they have a wider range of adjustability. Alternatively, the strap may be custom-formed on-site to provide the exact spaced desired.

A common problem found in prior art adjustable pipe hangers is that each installation required a great amount of manual labor to create the proper vertical spacing. For example, a typical pipe run may drop ¼ inch per 4 feet, requiring that each hanger be slightly different from adjacent hangers. In addition, pipe runs must change direction to make required connections and avoid obstructions, and many prior art hanger assemblies are not easily adapted to angle changes. Moreover, this labor usually involves overhead work which is difficult and tiresome, especially when complicated by angled couplings and drop runs. These factors combine to cause a high labor rate for pipe hanger installations, in addition to the cost of the pipe hanger devices and materials.

SUMMARY OF THE PRESENT INVENTION

The present invention generally comprises a pipe hanger assembly that provides infinite adjustment of vertical spacing throughout a wide range of adjustability. A salient aspect of the invention is that vertical spacing adjustment is accomplished virtually instantaneously, with an absolute minimum of labor, and that the spacing may be changed at any time with equal ease. A further aspect of the invention is the provision of a pipe-engaging clamp consisting of a generally circular, spring-action clamp that is engaged about a pipe without tools or component assembly. The invention also includes a unique spring clip that joins two wires or rods in a parallel relationship, the clip permitting selective longitudinal adjustment of both of the wires or rods with respect to the clip.

The pipe hanger assembly includes a pipe clamp member comprising a first wire or rod having a linear segment extending upwardly from a distal open circular loop. The end of the circular portion include an integrally formed hook portion adapted to engage a distal portion of the linear segment. The wire or rod is preferably formed of resilient material, such as steel wire, so that the circular loop may be deformed to open and engage the circumferential surface of a pipe, and then closed about the pipe by engaging the hook about the linear segment. The assembly also includes a second wire or rod having a linear segment and an integral upper eye formed thereby. The eye may be secured to an existing structural member by a screw, nail, or similar fastener.

The spring clip of the pipe hanger assembly includes a central web, and two pair of arms extending integrally from the web. Each pair of arms is disposed in a V-configuration, and two pairs of arms are disposed in a generally parallel relationship. Each pair of arms includes aligned hole in each arm, so that a wire or rod may be extended through the aligned holes. The holes are dimensioned and positioned so that the wire or rod may be slidably translated through the aligned holes of one pair of arms when the pair of arms are resiliently deformed by manually squeezing the pair of arms together. Releasing the arms permits the arms to flex outwardly by intrinsic resilient force, whereby the edges of the aligned holes engage the wire or rod and form a frictional lock with the surface of the wire or rod.

The linear segment of the first wire or rod is extended through the aligned holes of one pair of arms of the spring clip, and the linear segment of the second wire or rod is extended through the other pair of arms of the clip. Each pair of arms of the spring clip may be actuated independently to permit the longitudinal adjustment of the spacing of the first and second wires or rods, whereby the spacing of the circular loop from the existing structural member may be selectively varied in an infinitely adjustable manner throughout the entire range of adjustment of the assembly. It is significant that the first and second members are rotatable 360° in the spring clip, so that changes in direction of a pipe run are inherently accommodated. No tools or assembly are required to effect the spacing adjustment or angle adjustment, which is virtually instantaneous.

BRIEF DESCRIPTION OF THE DRAWING

FIG. 1 is a perspective view of the pipe hanger assembly of the present invention.

FIG. 2 is an end view of the spring clip of the pipe hanger assembly of the present invention.

FIG. 3 is a side view of the spring clip depicted in FIG. 2.

FIG. 4 is a plan view of the lower wire member of the pipe hanger assembly of the invention.

FIG. 5 is a partial side view of the lower wire member, taken along lines 5—5 of FIG. 4.

FIG. 6 is a plan view of the upper eye end of the upper wire member of the pipe hanger assembly.

FIG. 7 is a side view of an alternate embodiment of the upper end of the upper wire member for engaging a ceiling structure.

FIG. 8 is a front view of the alternate embodiment shown in FIG. 7.

FIG. 9 is an end view of an alternate embodiment of the spring clip of the invention.

FIG. 10 is an end view of a further embodiment of the spring clip of the invention.

FIG. 11 is a bottom view of another embodiment of the spring clip of the invention.

FIG. 12 is a side view of the embodiment of FIG. 11 shown mounted to a structural member.

DESCRIPTION OF THE PREFERRED EMBODIMENT

The present invention generally comprises a pipe hanger assembly that offers a wide range of adjustment of vertical spacing and an infinite adjustability feature. With regard to FIG. 1, the pipe hanger assembly 11 includes an upper wire member 12, a lower wire member 13, and a spring clip 14 joining the upper and lower wire members 12 and 13. The pipe hanger assembly 11 is designed to support a pipe 16 (or duct, conduit or the like) in suspended fashion from a structural member 17.

With regard to FIGS. 1, 4 and 5, the lower wire member 13 comprises an upper linear segment 21 joined integrally to a lower loop portion 22. The loop 22 is open and generally circular, with the distal end formed as a hook 23 which is adapted to engage the linear portion 22 to close the loop about a pipe or conduit 25. The wire member 13 is formed of a resilient, form retaining material. In the preferred embodiment, the material is galvanized steel wire having a diameter of 0.125 inch. The entire loop portion may be coated with a smooth plastic dip material to decrease friction and protect the pipe. In the quiescent condition, the loop 22 is open and the hook 23 is separated from the linear segment 21, as shown in FIG. 4. Engaging the hook 23 about the linear segment deforms the wire from the quiescent condition, and the resilient restoring force of the material maintains the hook engagement. The weight of the pipe cannot loosen the hook engagement, but the hook easily may be disengaged by manual effort.

As shown in FIGS. 1 and 6, the upper wire member 12 consists of a linear segment 26 having an integrally formed eye 27 at the upper end thereof. The member 12 may preferably be formed of the same material as the lower wire member. The eye 27 is provided so that a screw, nail, or similar fastener 28 may be passed therethrough and secured in a structural member 29, thus supporting the assembly in depending fashion.

The spring clip 14, shown in FIGS. 1-3, includes a medial web portion 31 and two pair 32 and 33 of opposed arms 32a and 32b, and 33a and 33b, respectively. The pairs of arms 32 and 33 extend integrally from the web 31, and a pair of cutouts 34 and 36 define and separate the pairs of arms. Each pair of arms 32 and 33 extend in generally in a V configuration from the medial web 31, and may be provided with converging tabular ends 37 to facilitate manual engagement. A pair of aligned holes 42 are formed in the pair of arms 32, and a pair of aligned holes 43 are formed in the pair of arms 33. The holes 42 and 43 are dimensioned to receive the linear segments of the upper and lower wire members 12 and 13 with minimal sliding clearance.

For example, the holes 42 and 43 may have diameters of approximately 0.140 inch. When a pair of arms are squeezed together so that they approach a parallel disposition, the respective linear wire segment passing therethrough clears both holes with sliding clearance. (The portion of each arm extending from the hole 42 or 43 to the respective tabular end comprises a lever arm.) When the arms are released, the outward divergence of the pair of arms causes the edges of the holes to impinge on the respective linear wire segment and secure it with a strong frictional grip. Thus the entire length of the linear segment may be translated through the respective holes 42 or 43, and the clip may be latched at any point along the linear segment. Thus the clip provides infinite adjustability throughout a wide range of adjustment, unlike other prior art device. Moreover, the adjustment of linear positioning is achieved without tools or fixtures or any modification, and accomplished in a few seconds.

The medial web and the arms are formed of a single piece of resilient, durable material, such as 0.025 thick spring steel. This material is one of many that provides sufficient elastic resiliency to exert the frictional force required to hold the wire segment in the holes 42 and 43. This construction also permits the clips to be manufactured easily and inexpensively by stamping and forming them from sheet steel in large quantities, and treating the steel to impart the requisite modulus of elasticity.

The linear segments of the upper and lower wire members may be any desired length that is appropriate for an expected range of pipe hanger adjustment. Increasing the length does not sacrifice the infinite adjustment feature, nor does it increase installation time or adjustment time. It may be appreciated that the linear segments of the upper and lower wire members must be inserted through the respective pairs of holes 42 and 43, and this assembly may take place during manufacturing or at the installation site. To facilitate this assembly, an alternative embodiment 114 of the spring clip may be provided, as shown in FIG. 9. In this embodiment similar features are labeled with the same reference numerals as noted previously. The holes 42 and 43 are replaced by two pair of slots 142 and 143 extending into respective pairs of arms. The slots each include a wide opening 144 and a narrow inner detent end 146 extending obliquely from the opening 144 toward the distal ends of the arms, and the slots 142 and 143 are disposed in enantiomorphic relationship. The detent ends 146 of the slots are dimensioned to engage and retain a respective linear segment of the upper or lower wire members. The open out ends of the slots permits easy lateral insertion of the wire into the slots when the arms are converged manually, and the detent ends of the slots retain the wires when the resilient restoring force of the arms urges the arms to diverge outwardly in a wider V configuration.

In a further embodiment 214 of the spring clip, shown in FIG. 10, the holes 42 and 43 are replaced by two pair of slots 242 and 243 extending into respective pairs of arms. The slots each include a wide opening 244 and a narrow inner detent end 246 extending obliquely from the opening 244 toward the medial web of the clip and the slots 242 and 243 are disposed in enantiomorphic relationship. The detent ends 246 of the slots are dimensioned to engage and retain a respective linear segment of the upper or lower wire members. The open out ends of the slots permits easy lateral insertion of the wire into the slots when the arms are converged manually, and the detent ends of the slots retain the wires when the resilient restoring force of the arms urges the arms to diverge outwardly in a wider V configuration.

It may be appreciated that the eye 27 of the upper wire member is adapted to secure the assembly to a vertical surface of a structural member, as shown in FIG. 1. The invention also includes a further embodiment, shown in FIGS. 7 and 8, which provides a bracket 51 for securing the assembly to a horizontal surface, such as a ceiling, in depending relationship. The bracket includes opposed legs 52 and 53 in orthogonal relationship, the leg 52 extending horizontally. The vertically depending leg 53 includes a slot opening 56 and an integrally formed sleeve 54 dimensioned to receive the linear segment of the upper wire member. The upper distal end of the segment 26 includes a hook end 57 extending through the slot opening 56, so that the upper wire member is secured fixedly to the leg 53 of the bracket 51. Thus by introducing a screw 58 through a preformed hole in the leg 52, the bracket and upper wire member may be secured to a ceiling or similar surface. The wire segment 26 extends to the spring clip 14 (or 114 or 214) to support the remainder of the assembly, as described previously.

A significant advantage of the pipe hanger arrangement is that the members 12 and 13 are each rotatable through 360° in their mounting in the spring clip. Thus changing directions in the pipe run, angled structural mounting surfaces and the like are accommodated with no additional hardware or labor.

A further embodiment of the invention, depicted in FIG. 11, comprises a spring clip 300 which incorporates many of the features described previously and are labeled with common reference numerals. The arms 32 and 33 are provided with both the holes 42 and 43, as well as the slots 342 and 343, for securing the rod members 21 and 26. The provision of both mounting means for the rods 21 and 26 facilitates whichever mounting arrangement (as described previously) is most convenient for the situation. In addition, the web 31 is provided with a hole 350 for securing the clip 300 to a structural member. As shown in FIG. 12, a screw 301 may be extended through the hole 350 to mount the clip 300 on a structure 302. In this case, the upper member 12 of the assembly shown previously is not necessary; however, the arrangement of FIGS. 11 and 12 does provide infinite adjustability through a useful range, as well as rotatability of the lower member 13 to accommodate changes in pipe direction.

I claim:

1. A pipe hanger assembly, including;
an upper member, means for securing said upper member to an existing structure;
a lower member, means for securing said lower member to a pipe;
said upper member including an upper rod-like portion extending vertically, said lower member including a lower rod-like portion extending vertically;
spring clip means for joining said upper and lower member in infinitely adjustable vertically spaced fashion, said spring clip means including means for engaging said upper and lower rod-like portions in infinitely adjustable vertically spaced fashion;
said means for engaging said upper and lower rod-like portions including two pair of arms, each pair of arms disposed generally in a V-like configuration, and means for linking together said two pairs of arms.

2. The pipe hanger assembly of claim 1, wherein said means for securing said upper member to an existing structure includes an eye portion extending from an upper end of said upper rod-like portion, said eye portion dimensioned to receive a fastener therethrough.

3. The pipe hanger assembly of claim 1, wherein said means for securing said upper member to an existing structure includes an angle bracket secured to an upper end of said upper rod-like portion, said angle bracket including a first leg disposed to be secured to a horizontal surface, and a second leg for securing said upper end of aid upper rod-like portion.

4. The pipe hanger assembly of claim 1, further including means for resiliently biasing each of said pair arms to diverge in said V-like configuration.

5. The pipe hanger assembly of claim 4, wherein each of said arms includes means for releasably retaining a respective one of said upper and lower rod-like portions.

6. The pipe hanger assembly of claim 5, wherein said means for releasably retaining includes a pair of holes, each disposed in one of said pair of arms, said pair of holes disposed in linear relationship to receive said respective upper or lower rod-like portion therethrough.

7. The pipe hanger assembly of claim 6, wherein said holes are dimensioned so that the edges of said holes exert a frictional lock on said respective upper or lower rod-like portion, and convergence of said pair of arms against said resilient biasing means releases said frictional lock and permits longitudinal translation of said rod-like portion through said holes.

8. The pipe hanger assembly of claim 5, wherein said means for releasably retaining includes a pair of slots, each disposed in one of said pair of arms, said pair of slots including detent portions to receive and secure said respective upper or lower rod-like portion therethrough.

9. The pipe hanger assembly of claim 8, wherein said detent portions are dimensioned so that the edges of said detent portions exert a frictional lock on said respective upper or lower rod-like portion, and convergence of said pair of arms against said resilient biasing means releases said frictional lock and permits longitudinal translation of said rod-like portion through said detent portions.

10. The pipe hanger assembly of claim 4, wherein said two pairs of arms extend from a medial web, and said two pairs of arms are integrally formed with said web.

11. The pipe hanger assembly of claim 10, wherein said web is formed of a thin sheet of spring steel material.

12. The pipe hanger assembly of claim 10, wherein said two pairs of arms are disposed in generally parallel, spaced apart disposition.

13. The pipe hanger assembly of claim 4, wherein said means for securing said lower member to a pipe includes a loop secured to the lower end of said lower rod-like portion, and means for opening said loop and securing said loop about the circumferential surface of a pipe.

14. The pipe hanger assembly of claim 13, wherein said means for opening said loop includes a hook member formed at a distal end of said loop, said hook member adapted to releasably engage said lower rod-like member.

15. A spring clip for joining first and second rod-like members in longitudinally adjustable relationship, including two pairs of arms, each disposed generally in a V-like configuration, means for resiliently biasing each of said pair arms to diverge in said V-like configuration, each of said arms includes means for releasably retaining a respective one of said first or second rod-like portions, whereby convergence of said arms causes release of said rod-like portions and divergence of said arms causes frictional retention of said arms, and means for resiliently biasing each of said two pairs of arms to diverge.

16. The spring clip of claim 15, wherein said means for releasably retaining a respective one of said first or second rod-like portions includes a pair of holes, each disposed in one of said pair of arms, said pair of holes disposed in linear relationship to receive said respective first or second rod-like portion therethrough, said holes dimensioned so that the edges of said holes exert a frictional lock on said respective upper or lower rod-like portion, and convergence of said pair of arms against said resilient biasing means releases said frictional lock and permits longitudinal translation of said rod-like portion through said holes.

17. The spring clip of claim 15, wherein said means for releasably retaining includes a pair of slots, each disposed in one of said pair of arms, said pair of slots including detent portions to receive and secure said respective first or second rod-like portion therethrough, said detent portions dimensioned so that edges of said detent portions exert a frictional lock on said respective first or second rod-like portion, and convergence of said pair of arms against said resilient biasing means releases said frictional lock and permits longitudinal translation of said rod-like portions through said detent portions.

18. The spring clip of claim 15, wherein said two pairs of arms extend from a common medial web, and said two pairs of arms and said medial web are formed integrally of a sheet of spring steel.

19. The spring clip of claim 15, further including a mounting hole disposed approximately medially of said two pair of arms, and fastener means extending through said mounting hole and anchored to a structural member.

* * * * *